April 15, 1947.  LA MAR W. HARRIS ET AL  2,418,833
LAMINATED DENTURE
Filed Oct. 23, 1945

Inventor
LA MAR W. HARRIS
LLOYD W. COLTON

By Ralph L. Chappell
Attorney

Patented Apr. 15, 1947

2,418,833

UNITED STATES PATENT OFFICE 2,418,833

LAMINATED DENTURE

La Mar W. Harris and Lloyd W. Colton, United States Navy

Application October 23, 1945, Serial No. 624,006

5 Claims. (Cl. 32—2)

(Granted under the act of March 3, 1883, as amended April 30, 1928; 370 O. G. 757)

This invention relates to artificial dentures and particularly to laminated dentures prepared in part from acrylic resins.

The shortcomings of acrylic resins such as polymerized methyl methacrylate as denture bases have been recognized for some time by the dental profession. The primary shortcoming is the lack of dimensional stability; that is, there is a pronounced tendency to warp and change shape. In the molding process, it has been found impossible to mold methacrylate resins to fit a metal base, the molded plastic always warping to some extent and leaving the mold. Also, there may be further changes that occur in the mouth in a few weeks' time, due in part to the absorption of water. Acrylic resins possess a relatively low tensile strength, and for this reason fractures are common in partial dentures made of this resin, and full dentures are often broken when subjected to stress. However, other properties of acrylic resins make it desirable above all other known denture bases at the present time.

In general, the object of this invention is to take advantage of the desirable properties of acrylic resins while overcoming the disadvantages of such resins so as to provide strong, dimensionally stable dentures which do not warp and leave the mold and which will retain the same fit after months of wear in the mouth.

In accordance with this invention, the water absorption of an acrylic resin, such as polymerized methyl methacrylate, is reduced by admixing with another resin having a low water absorption coefficient, and the strength and dimensional stability are increased by reinforcement and lamination. To reduce water absorption, polystyrene is preferred. Methyl methacrylate has a water absorption coefficient of over 0.5%, while the water absorption of polystyrene is so low as to be practically immeasurable with standard test equipment. Mixtures of methyl methacrylate and polystyrene have much lower water absorption coefficients than methyl methacrylate alone. However, the color instability of polystyrene makes it advisable to use this plastic only on the tissue side of the denture, and it is preferred to use methyl methacrylate on all exposed surfaces.

In preparing polymeric mixtures of the type herein contemplated, it is preferred to mix monomeric styrene with monomeric methyl methacrylate and then add polymeric methyl methacrylate in powdered form in such proportions as to yield a doughy mass upon standing. The doughy mass is readily packed into the denture mold to form the tissue side of the denture, and is cured in conjunction with other plastics and reinforcing materials as described below.

While various reinforcing materials may be used, it has been found that fibrous materials offer many advantages, and, in particular, a woven fabric of fiber glass imparts great strength, rigidity, and permanence to the final article. Fiber glass cloth impregnated with a modified vinyl butyral, preferably in the proportions of about 25% to about 35% by volume of the cloth, has been found to be most suitable. The presence of free hydroxyl groups in a partial vinyl butyral resin improves its adhesion to the glass fibers and to outer laminations. Such partial vinyl butyral resins may suitably be modified to a curing or thermosetting form by adding from about 17% to about 70%, preferably 25%, of a phenol-formaldehyde resin. For impregnation, the modified vinyl butyral is dissolved in an organic solvent, such as a mixture of ethyl acetate and ethyl alcohol. Other reinforcing materials such as duck fabric may be used, but glass fabric is much to be preferred because of its low water absorption. Certain of the light weight, stainless alloy metals may be used as reinforcing materials, either in cast sheet form or in the form of a woven metal gauze or fabric. For example, an alloy comprising cobalt, chromium and nickel in various proportions, may be used to advantage.

For a more complete understanding of the invention, reference is made to the drawing, illustrating one embodiment of the invention, in which.

Figure 1:
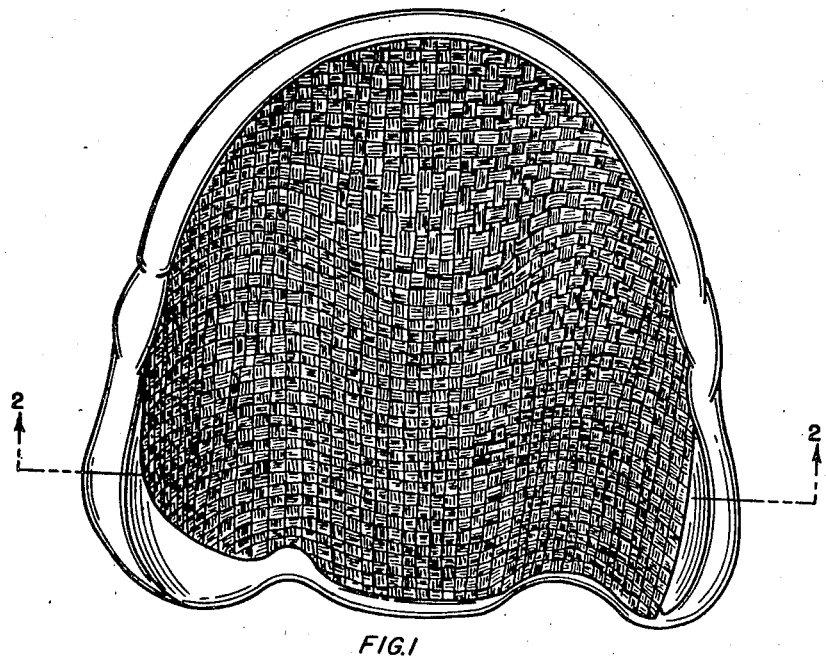
Figure 1 is a top plan view of a denture.
Figure 2:
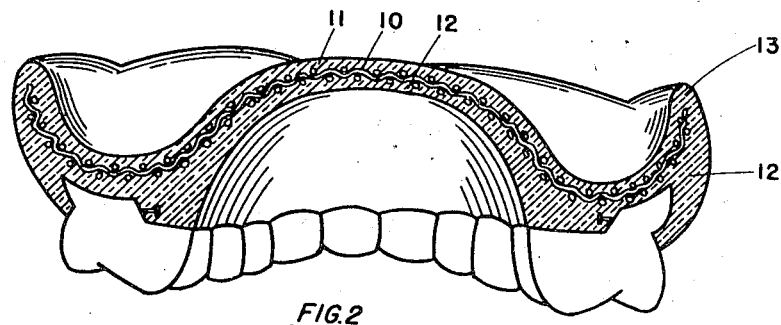
Fig. 2 is a vertical sectional view taken on the line 2—2 of Figure 1.

Referring in detail to the drawing, the numeral 10 represents the reinforcing material, which may be any of the above-mentioned reinforcing materials, and preferably is a woven fabric of spun glass threads. The reinforcing material 10 is shaped to conform to the general curvature of the denture and forms an inner layer having no portions externally exposed. On the tissue side of the denture is a mixed plastic layer 11 comprising a mixture of acrylic resin and polystyrene, which layer is bonded to the upper surface of the reinforcing material 10. On the exposed side of the denture, is an acrylic layer 12 which is bonded to the lower surface of the reinforcing material 10. The mixed plastic layer 11 merges with plastic layer 12 at the edge 13 of the denture, thus sealing the reinforcing layer 10 within the body of the denture.

In preparing dentures of the type illustrated in the drawing, utilizing fiber glass or other fabric as the reinforcing material, the fabric is first impregnated by immersion in a solution of modified polyvinyl butyral resin, preferably comprising 75% polyvinyl butyral and 25% phenol formaldehyde resin, then running the fabric through rolls to express the excess of resin until the fabric contains from 25% to 35% by volume of the resin, and then drying at about 165° F. until there are no signs of tackiness. The impregnated fabric is then cut into blanks of the approximate size to fit denture bases. To prepare the blank for lamination in conjunction with plastic materials, it is immersed in boiling water until softened sufficiently to allow its adaptation to the cast side of a denture flask before any packing is done. It is then removed and carefully trimmed to two or three millimeters short of the periphery, re-adapted, chilled, and set aside until needed.

Fiber glass identified in the trade as E. C. C. 164 is one example of a suitable glass fabric, but the size of the mesh can be varied from a very fine mesh to an even coarser mesh. The term "E. C. C." means "electrical continuous cloth" and the number following the term indicates the warp. Particularly good results are obtained by impregnating two separate layers of E. C. C. 116 fiber glass and inserting them into the denture at cross warp, in direct contact with each other.

In molding the laminated denture of this invention, the case is first invested, either for compression or injection molding, in the manner well known in the art. The wax is boiled out and the investment is thoroughly flushed with clean boiling water. If the separating medium is pure tinfoil, the wax set-up will have been tinfoiled before the investment was placed in the upper half of the flask. After separating and cleaning, the cast side is carefully foiled and the case is ready for packing. If, however, one of the alginate preparations is used as the separating medium, it is applied to both halves of the flask after the case is cleaned and has stopped steaming. When dry the case is ready to be packed.

Before starting the actual packing, it is necessary to place over the cast side a spacing material which will determine and control the desired thickness of the mixed plastic layer 11 of the denture. This spacing material should be approximately one half the thickness of the palatal area and may be: (1) Ash's tray metal No. 7, burnished to the cast to the exact peripheral line; (2) a sheet of base plate wax adapted and trimmed to the exact peripheral line; or (3) a piece of damp blotting paper adapted and trimmed in the same manner. When this is securely in place, the previously prepared fiber glass blank should be fitted to the cast and then removed.

The first resin to be packed is the acrylic resin. Suitable resins of this type are commercially available, tinted and otherwise prepared for ready use. For example, powdered polymerized methyl methacrylate is mixed in suitable proportions with monomeric methyl methacrylate and allowed to stand until the mixture is putty-like. The usual proportions are one part of monomer to about three or four parts of polymer. The putty-like mixture is packed, in excess, in the tooth side of the flask. Two sheets of dampened Cellophane are placed over the resin, a trial closure is made, and the flask is then opened to remove the excess resin and flash.

At this stage, the spacing material is removed and discarded. About the same amount of the mixed plastic, comprising polystyrene and methyl methacrylate, as the bulk of the spacing material is adapted to the cast side of the flask. This mixed plastic may be prepared by mixing about 80% of monomeric styrene and about 20% of monomeric methyl methacrylate, and then mixing the liquid thus formed with powdered polymeric methyl methacrylate, in the proportions of about one part of liquid to about four parts of powdered polymer. After thorough mixing, the mixture is allowed to stand until it is doughy or putty-like. After packing this mixture in the cast side of the flask, two sheets of dampened Cellophane are placed over it, and a trial closure is made, followed by removal of excess and flash and the Cellophane. If it is evident that sufficient material has been used, the preformed fibrous reinforcing material is inserted, and the flask is closed for curing. Suitable curing methods are: (1) Place the flask in water at room temperature, raise the temperature at the rate of two degrees per minute, and then boil for at least 45 minutes, or (2) place the flask in water at 160° F. for three hours and then boil for at least 45 minutes.

The finished denture is a stable product, which does not leave the mold and which will fit a metal die. There is no distortion of the denture base, as was usually the case with acrylic resins alone, said distortion of acrylic resins being probably caused by the release of internal strains. By laminating and processing four different resins at the same time, according to the process of this invention, it appears that four distinctly different strain patterns may be formed which counteract each other and give stability to the finished product. Some of the important differences in physical properties of the laminated product of this invention, utilizing fiber glass E. C. C. 164 as the reinforcing material, are listed in the following table.

| Shear strength | Izod impact strength |
| --- | --- |
| Pounds per square inch | Foot pounds per square inch of notch |
| Polystyrene ---------- 6,540 | Polystyrene ---------- 0.3–0.5 |
| Ethyl cellulose ------- 4,240 | Methyl methacrylate --- 0.2–0.6 |
| Our laminate --------- 8,450 | Our laminate --------- 5.49 |

When other fibrous materials are used instead of fiber glass, the laminated product shows great improvements over the unlaminated products of the prior art, although the improvements are not as great as in the case of the fiber glass laminates.

Obviously, many modifications and variations of the invention, as hereinbefore disclosed, may be made without departing from the spirit and scope thereof, and therefore only such limitations should be imposed as are indicated in the appended claims.

The invention described herein may be manufactured and used by or for the Government of the United States of America for governmental purposes without the payment of any royalties thereon or therefor.

We claim:

1. A laminated denture comprising a portion of glass fabric, impregnated with a modified vinyl butyral, a portion of acrylic resin bonded to said fabric on the exposed side of the denture, and a portion comprising a mixture of acrylic resin and polystyrene, bonded to said fabric on the tissue side of the denture.

2. The laminated denture of claim 1 wherein said acrylic resin is polymerized methyl methacrylate.

3. The laminated denture of claim 1 wherein said modified vinyl butyral comprises vinyl butyral and from about 17% to about 70% of phenol formaldehyde.

4. A laminated denture comprising a reinforcing layer of glass fabric, impregnated with a vinyl butyral resin modified by the addition of about 25% of phenol formaldehyde, a layer of methyl methacrylate resin bonded to said reinforcing layer on the exposed side of the denture, and a layer of mixed plastic bonded to said reinforcing layer on the tissue side of the denture, said mixed plastic comprising a mixture of methyl methacrylate and sufficient polystyrene to reduce the water absorption coefficient.

5. The laminated denture of claim 4 wherein said mixed plastic is the product obtained by curing a mixture of about four parts of polymeric methyl methacrylate and about one part of a liquid containing about 80% of monomeric styrene and about 20% of monomeric methyl methacrylate.

LA MAR W. HARRIS.
LLOYD W. COLTON.

REFERENCES CITED

The following references are of record in the file of this patent:

UNITED STATES PATENTS

| Number | Name | Date |
|---|---|---|
| 2,312,227 | Yant | Feb. 23, 1943 |
| 1,945,767 | Bergerhausen et al. | Feb. 6, 1934 |
| 2,013,295 | Tidd | Sept. 3, 1935 |
| 2,036,678 | Blake | Apr. 7, 1936 |
| 2,341,604 | Dresch | Feb. 15, 1944 |